Feb. 26, 1963
C. G. B. GARRETT ET AL
TERBIUM AND CERIUM ACTIVATED CALCIUM FLUORIDE OPTICAL MASER MATERIAL
Filed Oct. 25, 1960
3,079,347
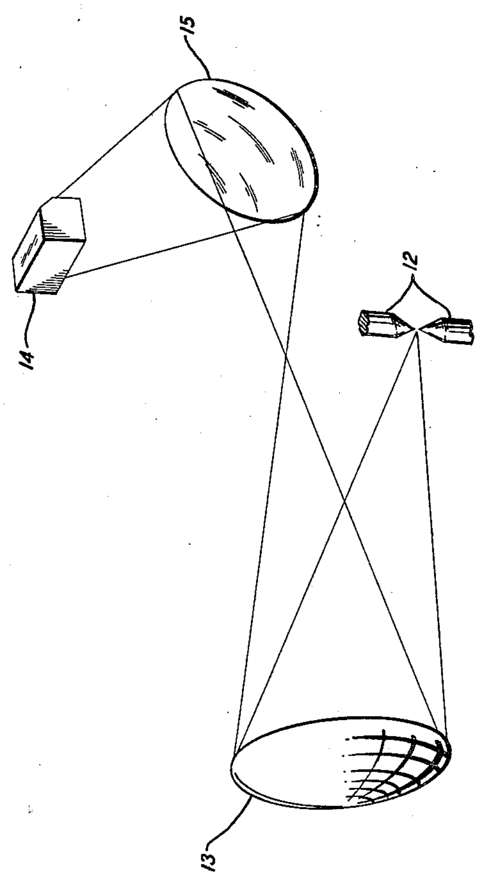
INVENTORS: C.G.B. GARRETT
W.K. KAISER
BY
George S. Indig
ATTORNEY United States Patent Office 3,079,347

Patented Feb. 26, 1963

3,079,347

TERBIUM AND CERIUM ACTIVATED CALCIUM FLUORIDE OPTICAL MASER MATERIAL

Charles G. B. Garrett, Morristown, and Wolfgang K. Kaiser, Summit, N.J., assignors to Bell Telephone Laboratories, Incorporated, New York, N.Y., a corporation of New York Filed Oct. 25, 1960, Ser. No. 64,883

2 Claims. (Cl. 252—301.4)

This invention relates to a novel luminescent material, and, more particularly, to a luminescent material comprising calcium, terbium, cerium and fluoride ions which is suitable for use in optical masers.

Recently, considerable interest has developed in a class of devices including media in which stimulated emission occurs. These devices are commonly termed "masers" and are of particular interest as amplifiers or oscillators where advantage may be taken of desirable low noise characteristics.

It is characteristic of a maser that it employ a medium in which there is established, at least intermittently, a non-equilibrium population distribution in a pair of spaced energy levels of its energy level system. In particular, the population of the higher of the selected pair of energy levels is increased to the point at which it is greater than that of the lower level. It is customary to refer to such materials as negative temperature mediums. A competing process known as relaxation tends to return the system to equilibrium. It is characteristic that if there be applied to a medium in a negative temperature state a signal of a frequency which satisfies Planck's law with respect to two energy levels which are in non-equilibrium, then the applied signal will stimulate the emission of radiation at the signal frequency from the medium and the signal will be amplified.

Among the more promising forms of masers known is one which employs for the negative temperature medium a material whose energy level system is characterized by at least three energy levels, with the separation of these three energy levels falling within desired operating frequency ranges. In other words, a crystal is chosen such that two levels are separated by an energy equal to $h\mu$ where $h$ is Planck's constant and $\mu$ is equal to the frequency to be amplified. The separation aluded to is less than another set of levels which are saturated by a pump. Pump energy is applied to the material to effect a transition from the lowest to the highest of the selected three levels. By application of sufficient pump power, the populations of the top and bottom levels can be made to approach equality; under these conditions, there will be a negative temperature either between the top and middle levels or between the middle and bottom levels. Three level maser devices emitting energy in the microwave region are treated at some length in the literature and are playing an increasing role in radar and communication systems.

This invention is concerned with a more recent class of maser devices in which the stimulated frequency, $\mu$, is in the optical or near optical spectrum. Such devices, the first capable of emitting coherent light radiation, are herein referred to as optical masers. In principle these devices are directly analagous to the microwave maser. In a mechanism involving the three level form, required for continuous wave operation, pump frequency of at least the Planck frequency corresponding with a separation between a ground and excited state together with a subsequent relaxation to a metastable state sufficient to result in at least an equal population distribution between this metastable and some lower state fulfills the negative temperature requirements. Application of wave energy of the frequency corresponding with the energy operation between such metastable and lower state in accordance with Planck's law, as in the microwave analog, results in the stimulation of energy of the same frequency in phase with the stimulating signal. Providing the relaxation rate from the metastable to the lower state is suitably slow and providing means for a preferred mode operation, the resulting energy output is single mode and coherent.

There is herein described and claimed a luminescent composition of matter containing calcium, terbium, cerium and fluoride ions in which the stimulated emission of radiation occurs. This material is capable of emitting energy of narrow line width in the light spectrum at a defined frequency and evidences a relaxation time which is long enough so that the quantum efficiency for fluorescence is close to unity.

The invention will be more completely described by reference to the accompanying drawing wherein:

FIG. 1 is a front elevational view of an apparatus embodying the novel composition of the present invention.

Referring more particularly to FIG. 1, there is shown a coherent optical generator using maser action. Serving the function of a cavity is a crystal of cubic geometry having the composition as disclosed herein. In the particular device shown, the faces of the crystal are polished to within $5 \times 10^{-5}$ centimeters and are perpendicular to within one minute of arc. The crystal is pumped with radiation emitted from lamps 12 which are ultraviolet lamps having a compact arc of high pressure mercury. The ultraviolet light emitted from the lamps is focused on the crystal by spherical mirrors 13 and 15. The crystal is designed with imperfection 14 serving to emit the coherent light from the crystal as shown.

The crystal, during its operation, is preferably maintained in an atmosphere of liquid nitrogen (at a temperature approximating 79° K.), so enabling the activator to emit in narrower line width. The monochromatic coherent light generated in this maser crystal has a wavelength of 5500 A.

The host lattice of a material meeting the above-described requirements must be capable of accepting the luminescent atoms in such a way that they are able, on excitation, to fluoresce with good overall quantum efficiency so as to allow as much of the emitted energy as possible to be concentrated in a single line, and preferably a line corresponding to a transition to a state other than the ground state in such a way that the single bright emission line is narrow in width. In addition, the material should preferably be cubic, so as to lead to optical isotrophy; and it should be easy to polish, and obtainable in a state of good optical quality.

A further requirement of a media in which stimulated emission occurs is the presence therein of an activator capable of emitting in narrow line width. Terbium ion possesses such qualities, however, it is a material which has a narrow absorption spectrum and is selected in output. Thus, it is difficult to pump terbium easily as the pump source generally possesses a broad spectrum and the material can only absorb a narrow portion. This difficulty is overcome by the use of cerium ion. Borrowing from phosphor terminology, cerium ion acts as a sensitizer. This material has a broad absorption spectrum and transmits energy so absorbed to the terbium ions, so increasing the efficiency of utilization of the pump spectrum. Although cerium ion by itself in calcium fluoride has a characteristic emission spectrum, this is largely suppressed when adequate terbium ion is present. Thus, the efficiency of transfer of energy from the cerium ion, which absorbs it, to the terbium ion, which emits it, is high. In addition, it has been found that the cerium ion does not, at low concentrations, lead to any objectionable broadening of the terbium emission lines themselves. The addition of the cerium ion permits the use of any wavelength less than 3,000 Angstrom units as an activating source and is capable of transmitting energy through the calcium fluoride directly to the terbium ion without the intermediate loss of energy through the fluoride.

The percentage of terbium ion by weight of the total composition may vary depending upon the particular characteristics desired. Thus, a calcium fluoride host lattice may contain from 0.1 to 10 percent of terbium ion activator. However, for maser application it has been determined that percentages of the order of 0.3 to 3 percent are more suitable. Ideally, 1 percent of terbium ion based on the weight of the total composition is employed. For values less than 0.3 percent the brightness of the material decreases below the desired level whereas for concentrations in excess of 3 percent the emission lines become substantially broadened.

The percentage of terbium ion by weight of the total composition corresponds with a mol ratio of terbium ion within the range of 0.0071 to 0.0711 mol percent.

It is desirable to substitute equivalent amounts of terbium and cerium ions in the host lattice. The addition of cerium ions in amounts substantially exceeding that of terbium results in line-broadening whereas use of substantially less cerium than terbium ion increases the difficulty of excitation of that material. It has been determined that an optimum is achieved by the use of cerium and terbium ions in a one to one molecular ratio. However, a one to one ratio is not critical and variations up to 50 percent and greater may be made without seriously impairing efficiency, so indicating the use of cerium ions in an amount within the range of (0.5–1.5) the amount of terbium ions.

As indicated above, from a maser standpoint an economical method of activating this material is by the use of an ultraviolet lamp in combination with high aperture mirrors. The spectrum of the pump source is desirably within the range of 2,000 to 3,000 Angstrom units. At wavelengths appreciably beyond 3,000 Angstrom units the cerium ion ceases to absorb, so determining an upper limit. Whereas higher frequencies are suitable, sources of such frequencies are not generally available. Ultraviolet lamps having a spectrum largely in the range of 2,000 to 4,000 Angstrom units are suitable, and it has been found that an ultraviolet light source having a peak of 2,500 Angstrom units is most advantageous for the present purposes.

The expressed range is the range of energy most effective, however, it is not necessary to use a source having an output restricted to this range. For example, original work describing non-continuous maser action advantageously utilized a gaseous discharge flashbulb, which, although emitting white light, nevertheless resulted in emission of large amounts of energy in the desired spectrum.

The general formula for the preferred embodiment of the novel material of this invention may be represented as $(Ca_xTb_yCe_z)F_n$ where $x$ is a quantity within the range of 0.8222–0.9893, $y$ is a quantity within the range of 0.0071–0.0711, $z$ is a quantity within the range of $(0.5–1.5)y$ and $n$ is a quantity sufficient to complete the molecular formula. In the making of the preferred composition of this invention the following raw mix components may be used in the following proportions:

*Example 1*

$$(0.98\ Ca\ 0.01\ Tb\ 0.01\ Ce)F_2$$

The procedure employed for preparing this material is as follows. The powdered terbium fluoride and cerium fluoride were distributed evenly along the length of a graphite boat, 11 inches in length and ¾ inch in width. Next the calcium fluoride crystals, cut to convenient size, were placed over the powdered doping material in order to reduce losses caused by volatility of the terbium fluoride and cerium fluoride and to assure that the melt would enter solution directly. The boat was then inserted into a quartz tube, helium flowed through the system, and a radio frequency generator employed as a source of heat. Heating was initiated by passing the core of the generator over the boat in a first pass at the rate of 4 inches per hour, the temperature being maintained at about 1400° C. After concluding the first pass, the core was then permitted to pass over the boat a second time at the rate of 2 inches per hour at a temperature of approximately 1400° C. The graphite boat was then annealed uniformly in an annealing furnace at a temperature of 1000° C. for 6 hours in order to avoid cleavage of the calcium fluoride due to thermal strains. The boat was then cooled at 200° C. per hour for 24 hours and the resultant crystal removed.

The objects of the present invention may be realized in an illustrative embodiment wherein the composition produced in Example 1 is employed as the negative temperature medium in the apparatus described by Schawlow and Townes in U.S. Patent 2,929,922 patented on March 22, 1960, or in that described by C. G. B. Garrett in copending application, Serial Number 64,879, filed October 25, 1960.

While the invention has been described in detail in the foregoing specification and the drawing similarly illustrates the same, the aforesaid is by way of illustration only and is not restrictive in character. The several modifications which will readily suggest themselves to persons skilled in the art, are all considered within the scope of this invention, references being had to the appended claims.

What is claimed is:

1. A composition of matter having the general formula $(Ca_xTb_yCe_z)F_n$ where $x$ is a quantity within the range of 0.8222–0.9893, $y$ is a quantity within the range of 0.0071–0.0711, $z$ is a quantity within the range of $(0.5–1.5)y$ and $n$ is a quantity sufficient to complete the molecular formula.

2. A composition of matter having the formula $(Ca_{0.98}Tb_{0.01}Ce_{0.01})\ F_2$.

References Cited in the file of this patent

UNITED STATES PATENTS

| | | |
|---|---|---|
| 2,757,144 | Lind | July 31, 1956 |
| 2,929,922 | Schawlow et al. | Mar. 22, 1960 |
| 2,979,467 | Keller | Apr. 11, 1961 |

OTHER REFERENCES

Ginther: "Sensitized Luminescence of $CaF_2$:(Ce—Mn)," J.ElectroChem.Soc., vol. 101, No. 5, May 1954, pages 248–257.